United States Patent Office 3,055,946
Patented Sept. 25, 1962

3,055,946
STABILIZATION OF UNSTABLE MERCAPTANS
Paul F. Warner, Phillips, Tex., assignor to Phillips Petroleum Company, a corporation of Delaware
No Drawing. Filed Oct. 7, 1960, Ser. No. 61,087
6 Claims. (Cl. 260—609)

This invention relates to a process for stabilizing unstable mercaptans. In one aspect, this invention relates to the stabilization of unstable mercaptans by converting the mercaptan to a disulfide and reducing the disulfide to a mercaptan prior to use. In another aspect, the invention relates to a process for handling a cyclohexenylethyl mercaptan or a mercapto-ethyl vinylcyclohexene by converting the material to corresponding disulfide and reducing the disulfide to the mercaptan prior to use. In another aspect, this invention relates to such a process in which the conversion to the disulfide comprises oxidizing the mercaptan in the presence of a cupric halide solution.

When hydrogen sulfide is reacted with vinylcyclohexene, both mono- and di-mercaptans are formed. The mono-mercaptans thus formed are unstable and polymerize to a viscous oil of unknown structure. Cold storage and various polymerization inhibitors have been tried but no method for keeping the mono-mercaptan for more than a short period has been found.

An object of this invention is to provide a process for utilizing unstable mono-mercaptans.

Other aspects, objects, and the several advantages of this invention will be apparent from a study of the disclosure and the appended claims.

According to my invention, the mono-mercaptan to be stabilized is converted to the corresponding disulfide for storage, handling and shipping and the disulfide re-converted to the mercaptan as needed. According to my invention, a cyclohexenylethyl mercaptan or mercaptovinyl cyclohexene is stabilized by converting to the corresponding disulfide and the disulfide is reduced to the mercaptan prior to use. In a preferred embodiment according to my invention, the oxidation of the mercaptan to the disulfide is accomplished in the presence of a solution of a cupric halide.

When hydrogen sulfide is reacted with vinylcyclohexene using ultraviolet light as catalyst, both mono- and di-mercaptans are formed as illustrated by the following equation:

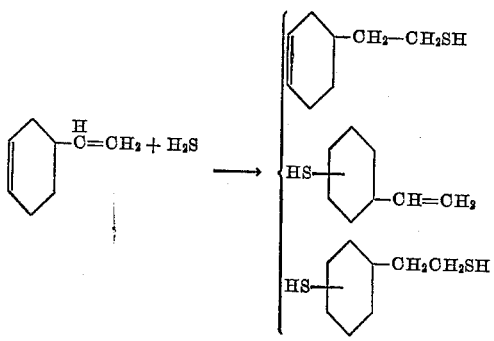

All of the products of the reaction have not been definitely established. However, fractionation of the reactor effluent has yielded fractions which contain predominantly one or both of the above illustrated mono-mercaptans, and a second fraction which contains predominantly di-mercaptan. The problem is that the mono-mercaptan fraction is unstable. It polymerizes to a viscous oil of unknown structure. Cold storage and use of various polymerization inhibitors have been tried but no method of keeping the mono-mercaptan for more than a short period has been found. The di-mercaptan appears to be perfectly stable.

The reaction products from the ultraviolet light promoted reaction of 4-vinylcyclohexene-1 and hydrogen sulfide when distilled exhibit three principal boiling plateaus. These plateaus occur at about 267° F., 409° F. and 525° F. The 267° F. plateau represents primarily the 4-vinylcyclohexene-1, while the 525° F. plateau represents primarily the dimercaptan of the 4-vinylcyclohexene-1. The 409° F. plateau represents the unstable mono-mercaptans which have been tested as outlined below. The 409° F. plateau referred to actually represents a range of about 400° F. to about 425° F.

By the process of my invention, the mono-mercaptan is converted to the disulfide which is completely stable and can be handled and shipped in this form without difficulty. The disulfide can be reduced to the mercaptan, as needed, for use.

It is preferred that the conversion to the disulfide form should be accomplished by oxidation in the presence of an oxidizing reagent phase which comprises a solution of cupric halide. Examples of such a process are disclosed and claimed in my earlier patent U.S. 2,839,581 (1958).

The reduction of the disulfide to the mercaptan may be accomplished by known methods. For example, in Analytical Chemistry, 29, No. 1, 154–5 (January 1957), disulfides are converted to mercaptans by reduction with sodium borohydride. In Journal of the American Chemical Society, 55, 1242–45 (1933) and Journal of the American Chemical Society, 53, 352–56 (1931), disulfides are reduced in the presence of sodium.

Another suitable method for the reduction of disulfides to mercaptans is by contact with zinc plus acetic acid. When a large scale operation is contemplated, reduction of the disulfide with hydrogen, using a cobalt molybdate catalyst, would be more economical than the above-listed methods.

In an example according to my invention, a 2,000 ml. graduated mixing cylinder was equipped with a sintered glass pencil for dispersion of air, and an infrared lamp for heating. In the run, 600 ml. of reagent solution (20 g. $CuCl_2 \cdot 2H_2O$ per 100 ml. methyl Carbitol) were placed in the graduate. The air was turned on to provide mixing and to supply oxygen for regeneration of the reagent solution. Freshly distilled vinylcyclohexene mercaptan was fed, rapidly at first, until all the copper was reduced to the cuprous state (color change dark green to light yellow), then the feed rate was reduced to be equal to the oxidation rate. Over the run the steady state rate was about 60 ml. mercaptan per hour or approximately 0.1 volume per volume of reagent solution per hour. The temperature was kept in the range 140 to 160° F. with the infrared light. The disulfide product was allowed to accumulate in the reactor until the end of the run; 640 ml. of mercaptan were oxidized. After the mercaptan addition was completed, aeration was continued for several hours to completely regenerate the solution. At this point, the two phases were so near the same color and specific gravity that separation was quite difficult; 300 ml. water were added and the phases were separated. The reagent phase was discarded. The organic phase was washed with water containing dilute ammonium hydroxide until no more copper was evident in the washings (blue color); an equal volume of benzene was added to reduce the viscosity and gravity and to facilitate phase separation during the wash operation. The organic phase was filtered, dried and flash distilled to remove benzene. The boiling point of the disulfide is somewhat above 320° F. at 0.4 mm. Hg (699° F.+ at 760 mm. Hg). The product is a viscous oil, yellowish brown in color, and contains some crystalline solids believed to be one of several possible disulfide isomers. The disulfide may be stored at ambient conditions for an extended period of time and then reduced by one or another of the methods outlined above for the purpose.

In the reduction of the disulfide to the mercaptan in the presence of sodium, a suitable pressure is in the range from atmospheric to 200 p.s.i.g. and a suitable temperature is in the range 140–250° F. and ethyl ether is a suitable solvent. In the reduction of disulfide using hydrogen in the presence of cobalt molybdate, the temperature range is 350–650° F. and the pressure from atmospheric to 1,000 p.s.i.g.

The cyclohexenylethyl and the mercapto-vinylcyclohexene disclosed herein appear to be useful as pesticides and as intermediates for the production of other compounds also useful as pesticides. These compounds also appear to be useful as rubber polymerization modifiers.

Reasonable variation and modification are possible within the scope of the foregoing disclosure and the appended claims to the invention, the essence of which is a process for the utilization of an unstable mercaptan by converting the mercaptan to a disulfide and subsequently reducing to the mercaptan prior to use and a process for the utilization of vinylcyclohexene thiol comprising stabilization by oxidation to a disulfide in the presence of a solution of cupric halide and subsequent reduction to the mercaptan prior to use.

I claim:

1. A process for utilizing an unstable mercaptan which comprises converting said mercaptan to a disulfide and reducing said disulfide to a mercaptan prior to use.

2. A process for utilizing a mercaptan selected from the group consisting of cyclohexenylethyl mercaptan and mercapto-vinylcyclohexene which comprises converting said mercaptan to a dicyclohexene dithiahexane for storage and reducing said dicyclohexene dithiahexane to a mercaptan prior to use.

3. A process for utilizing a mercaptan selected from the group consisting of cyclohexenylethyl mercaptan and mercapto-vinylcyclohexene which comprises oxidizing said mercaptan to the corresponding disulfide in the presence of a separate oxidizing reagent phase comprising a solution of a cupric halide and reducing said disulfide to a mercaptan prior to use.

4. A process according to claim 3 wherein the cupric halide is cupric chloride.

5. A process for storing a mercaptan which is unstable which comprises converting said mercaptan to a disulfide and then storing said disulfide.

6. A process for storing and then utilizing an unstable mercaptan which comprises converting said mercaptan to a disulfide, then storing said disulfide and then after a period of storage removing said disulfide from storage, reducing said disulfide to a mercaptan and then utilizing said mercaptan.

References Cited in the file of this patent
UNITED STATES PATENTS

| | | |
|---|---|---|
| 2,402,686 | Signaigo | June 25, 1946 |
| 2,839,581 | Warner | June 17, 1958 |
| 2,957,919 | Nutting et al. | Oct. 25, 1960 |